United States Patent

Engle

[11] 3,845,991
[45] Nov. 5, 1974

[54] BRAKE SYSTEM FOR A LIGHT RAIL VEHICLE

[75] Inventor: Thomas Engle, Cape Vincent, N.Y.

[73] Assignee: General Signal Corporation, Rochester, N.Y.

[22] Filed: Aug. 31, 1973

[21] Appl. No.: 393,529

[52] U.S. Cl. ............... 303/3, 303/21 A, 303/22 A
[51] Int. Cl. ............................................. B60t 13/74
[58] Field of Search ........................... 303/3, 15–18, 303/20, 21 A, 22 A

[56] References Cited
UNITED STATES PATENTS

| | | | |
|---|---|---|---|
| 3,059,974 | 10/1962 | Van Der Sluys | 303/22 A |
| 3,148,919 | 9/1964 | Simmons et al. | 303/3 |
| 3,482,887 | 12/1969 | Sheppard | 303/3 X |
| 3,536,361 | 10/1970 | Engle | 303/3 |

Primary Examiner—Duane A. Reger
Attorney, Agent, or Firm—Pollock, Philpitt & Vande Sande

[57] ABSTRACT

A brake system for a light rail vehicle having both dynamic and friction braking systems is disclosed. The system has three individual and redundant systems which act independently on each truck. The system uses a dynamic brake means which converts the propulsion motors to brake motors as the prime braking means. The system includes a fluid operated friction brake system with a blending means to supplement the dynamic braking with friction braking as needed to achieve the total braking force required. The system includes an air spring and variable load means to regulate the maximum amount of fluid pressure available for the friction brake means to prevent over application of the friction brakes and skidding of the wheels. The system further includes an independent hand brake means which affects actuation of the friction brake.

16 Claims, 4 Drawing Figures

BRAKE SYSTEM FOR A LIGHT RAIL VEHICLE

BACKGROUND OF THE INVENTION

The present invention relates to a braking system for use on a light rail vehicle, and more particularly, a mass transit or rapid transit car. Relatively complex braking systems have been used for passenger cars in the past, but the new rapid transit cars are substantially lighter than either standard passenger cars or freight cars. This results in a substantial change in the load to weight ratio of the vehicle. The load to weight ratio for older style passenger cars and freight cars does not change appreciably even when the vehicle is fully loaded. However, light weight rapid transit cars may carry a load which is equal in weight to that of the car body itself. This change in the load to weight ratio, together with the frequent and rapid stops of the rapid transit cars require a relatively more complex and sophisticated braking system.

The system of the present invention is particularly intended for use in electrified vehicles wherein dynamic braking is utilized. It is common practice to use the propulsion means of the vehicle as the braking means by reversing the traction motor fields and allowing the motor means to act as a generator when dynamic braking is required. The present invention is intended to provide a system which will combine the advantages of dynamic braking with the precision of friction braking through a blending control system.

The wide disparity in weight to load ratios also creates additional problems in friction braking. The amount of force required to effect a given speed reduction for a heavily loaded vehicle will cause the wheels of a lightly loaded vehicle to slide on the rails. This not only reduces the effective braking, but also creates flat spots on the wheel which require repair or replacement of the wheel and a reduction of the inservice time of the car. Accordingly, it is necessary to use proportional braking systems that will limit the maximum braking effort of the friction brakes in accordance with the weight of the vehicle.

In recent years air springs have replaced coil springs in rapid transit car suspension systems because of their superior ride characteristics. The present invention presumes the use of such an air spring suspension system.

The present invention is also concerned with a hand brake or parking brake for the vehicle. The engineering of the parking brake presents two problems for the designer. It is preferable to have a quick acting parking brake control separate from the friction brake control system to provide a redundancy for brake operation. Similarly, it is desired to have a hand brake control which can be actuated "by hand" or with as small an amount of mechanical assistance as is necessary. When the parking brake is engineered so that it can be applied by hand, it often requires a great deal of time to do so because substantial leverage principles are required to generate the force required.

It is also desirable to provide slip or skid detectors on mass transit or rapid transit vehicles. Since the stops are relatively frequent, and the train often encounters a variety of rail surfaces in a short distance, it is necessary to provide means for breaking the skid and reestablishing the brake force after the skid has been terminated.

SUMMARY OF THE INVENTION

The braking system of the present invention is intended for use on a light rail vehicle of the mass transit or rapid transit variety. The braking system has three individual friction braking systems which act independently and redundantly on each truck. More specifically, the brake system of the present invention utilizes an independent dynamic braking system and an independent pneumatically controlled friction brake system. The present invention also provides blending means for adding the proper amount of friction braking force to the force established by the dynamic brake system. The system uses the dynamic brake as a primary brake and energizes the friction brake only when the dynamic brake is incapable of producing the selected braking effort, and then only to the extent necessary to satisfy the deficiency.

The control system for the present invention also includes a "hand brake" or parking brake system with completely independent controls for actuating the friction brake. The parking brake utilizes a pneumatically restrained spring motor which drives a hydraulic motor when the parking brakes are applied. The parking brakes may be applied by merely venting or releasing the pneumatic motor which restrains the spring motor.

In addition to the three redundant systems disclosed above, there are two additional systems which are capable of independent intervention in the application of the friction brakes. The first is the variable load system which regulates the amount of fluid pressure available to the friction brake actuating mechanism. The variable load valve uses the air spring pressure to produce an output pressure of a minimum threshold value, or of a value proportional to the air spring pressure above the threshold. This proportional application of pneumatic pressure matches the application of the friction brake to the weight of the car.

It is also an object of the present invention to provide a completely independent wheel slip subsystem to release the brakes on any sliding truck, and then reapply the brakes when the wheel slip has been terminated. This wheel slip subsystem operates by comparing the speeds of all axles on the car and if the speed of one of the axles exceeds that of the others by more than a predetermined amount, it energizes a dump valve on the skidding truck to release the brakes.

The present invention is intended to provide a brake system for light rail vehicles wherein the dynamic brake means generates a variable electric current upon application of the dynamic brake means. The dynamic brake means includes a resistance means to receive at least a portion of the variable current generated by the dynamic brake. The system also includes a fluid operated friction brake means for the vehicle with an actuating mechanism which is responsive to variations in fluid pressure to actuate the friction brake means. The present invention also employs an electrical control means for energizing the dynamic braking means and the fluid operated friction brake means to effect braking of the vehicle. The present invention also includes a fluid pressure control means for providing variation in the fluid pressure applied to the friction brake means. The fluid pressure control means includes a blending means having an electropneumatic pressure transducer which responds to voltage variations across the resistance means, and to variations in the electrical control means so as to vary the fluid pressure supplied to the friction brake means. The fluid pressure control means also includes variable load means for controlling the amount of fluid pressure supplied to the blending means. The variable load means includes an air spring and a variable control valve means responsive to the pressure within the air spring to vary the fluid pressure supplied to the blending means. The present invention also includes a skid control means including a detector means to detect slip on one truck and a release valve for venting the fluid pressure supplied to the friction brake means of the affected truck only when the control means determines a skid condition. It is also an object of the present invention to provide an actuator for the friction brake comprising first and second pressure responsive fluid motors, with the first fluid motor responsive to positive fluid pressure variations to actuate the friction brake means. A spring motor is also provided and is responsive to reductions in fluid pressure supplied to the second fluid motor to actuate the braking means. The present invention also employs a hydraulic fluid motor actuated by the first pressure responsive fluid motor to provide hydraulic actuation of the friction brakes.

DESCRIPTION OF THE PREFERRED EMBODIMENTS

To aid in understanding the present invention, the entire brake control system, and the interaction of the various related components will be described with respect to functional block diagram FIG. 1. Each of the various subsystems will then be described in detail in connection with the description of the structural components of that subsystem.

Figure 1:
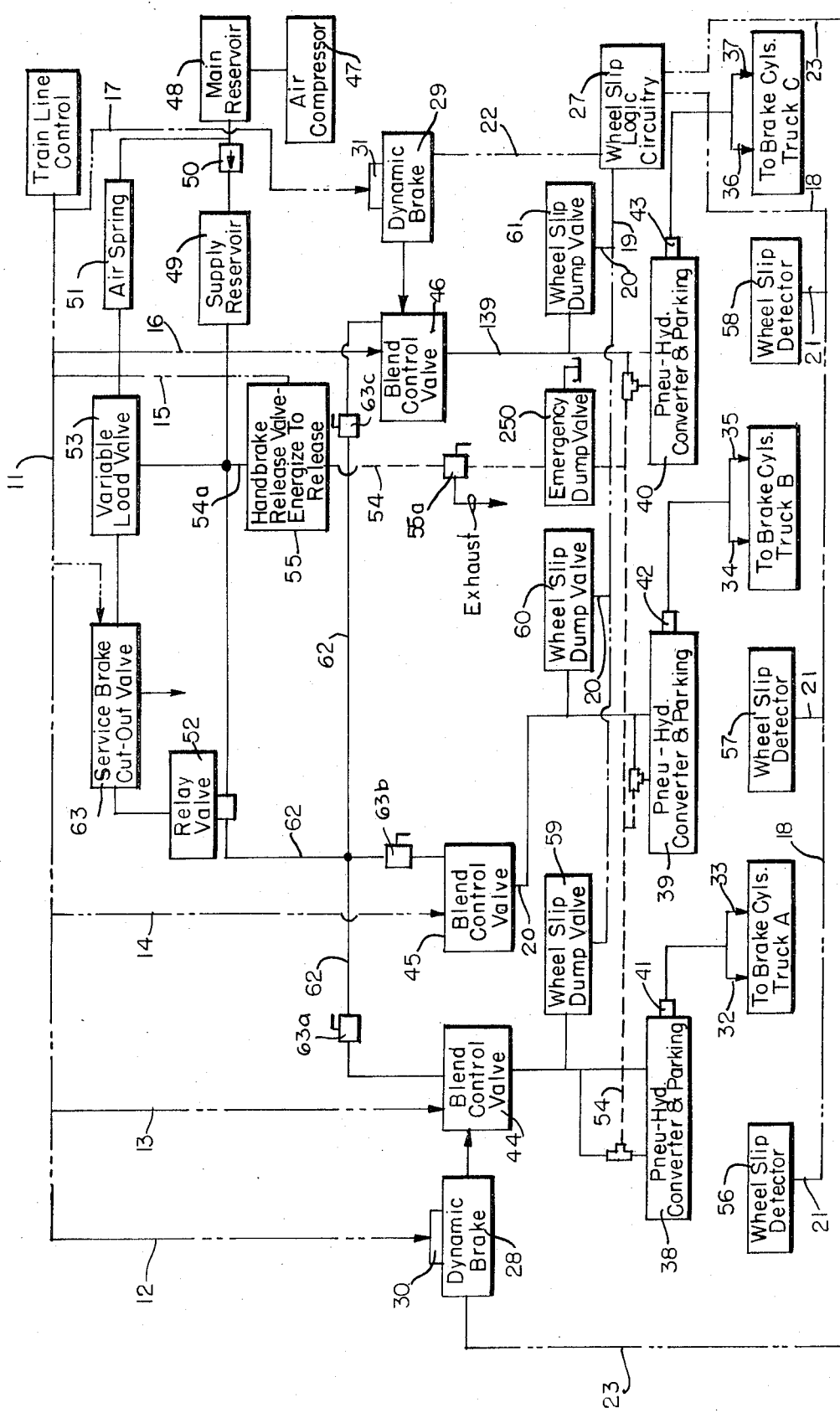
FIG. 1 is a functional block diagram of the interrelationship between the various components of the brake system of the present invention.

FIG. 1 illustrates the interrelationship between the electrical subsystem and the pneumatic subsystem. In addition, it illustrates the interrelationship between the three independent braking systems, and the two independent intervening systems. The three independent brake systems comprise the dynamic braking system, the pneumatically controlled friction brake system, and the independent hand brake system. The independent intervening systems include the variable load system and the wheel slip detection and release system.

As illustrated in FIG. 1, the electrical control system is represented by numeral 11, and circuit lines 12–17. In addition, logic control circuitry 27 and electrical circuitry 18–23 are provided for in the wheel slip subsystem.

The braking system of the present invention is intended for use in mass transit or rapid transit, and will customarily involve only a limited number of cars. This is contrasted with conventional brake systems which are intended for use in freight or passenger trains involving 150 to 200 cars. In the light rail vehicle for which the preferred embodiment is intended, propulsion units and dynamic brakes 28 and 39 are included for at least two of the vehicles' trucks. In addition, each of the dynamic brakes includes a controller (30 for dynamic brake 28 and 31 for dynamic brake 29) which responds directly to changes in current in the control line system 11. The design of the controller and the dynamic brake may take many different forms, and only one form is illustrated in the application. It is understood that the complete dynamic brake also includes a propulsion controller (not shown) which is normally mounted in the lead unit of the train which permits the operator to switch the propulsion control circuits of the traction motors between motoring and dynamic braking configurations.

The present invention also includes a pneumatically controlled friction brake system utilizing friction brakes 32 and 33 for truck A, 34 and 35 for truck B, and 36 and 37 for truck C. The present invention uses a pneumatic control system and pneumatic to hydraulic converters 38, 39 and 40 for converting the pneumatic control signals to hydraulic pressure. These converters amplify the pneumatic signals and facilitate the use of smaller actuators 32–37. The hydraulic portion of the braking system also includes slack adjustors 41, 42 and 43 to provide the close control of brake shoe clearance required with a fast response braking system.

Each of the pneumatically controlled friction brake motors is responsive to variations in pressure control. Each of the converters 38–40 includes first and second pressure responsive fluid motors. The first motor is responsive to positive variations in fluid pressure to actuate a hydraulic motor, while the second fluid motor is responsive to reductions in fluid pressure to actuate a spring motor means in the parking brake or hand brake system. The fluid pressure for the pneumatically controlled friction brake system is independently varied by two separate systems. The initial incoming air pressure is varied by the variable load valving circuitry, and this regulated pressure is then passed on to the blending control valves 44, 45 and 46. The blending control valve provides proper blending of the braking effort between the dynamic and friction systems. In the brake system of the present invention, the dynamic brake is used as the primary brake and the friction brake is energized only when the dynamic brake is incapable of producing the necessary braking effort, and then only to the extent necessary to satisfy the deficiency. The blending control valves 44–46 includes electropneumatic pressure transducers which respond to input signals for the dynamic brakes and from the electrical control system in order to produce an output pressure which is proportional to the required friction brake effort. The blending means provides a braking system which is able to increase and decrease the friction braking effort as required during a brake application to produce exactly the total braking effort called for by the operator through control system 11, regardless of any irregularities in the dynamic brake response atrributable to speed effects or malfunctions.

The system generates air for the pneumatic control system by means of air compressor 47 which feeds the main storage reservoir 48, and braking reserve or supply reservoir 49. This reservoir is sufficiently large to provide 15 full service brake applications and releases with the air compressor 47 completely inoperative. Supply reservoir 49 supplies the pressure for the pneumatic control system, which in turn actuates the friction brake system. This reservoir is isolated from the main reservoir by mens of check valve 50. The main reservoir 48 also suplies air pressure to all auxilliaries and to the air spring 51 located between the car truck and the car body. Check valve 50 and relay valve 52 isolate the pneumatic control system from the auxilliaries and the air spring system so as to prevent the loss of control pressure in the event of a rupture in air spring 51, or a malfunction of any of the auxilliary systems' components.

In normal operation, the variable load system regulates the amount of pressure available to the blending control valves 44-46. This is necessary since during a full brake application, that is, either a full service or emergency application, a predetermined amount of braking force is applied to the wheels of the vehicle through the friction braking system to bring the vehicle to a stop as quickly and as safely as possible. It is important, however, that the braking force not be excessive since this would cause the wheels to slide on the tracks. The sliding and skidding results in the formation of flat spots on the wheels and in a lengthening of the distance required to bring the car to a halt. Since the braking force required during a full brake application is proportional to the total weight of the car, including its load, it is necessary to provide means for measuring the load and regulating the brake cylinder pressure during a full service application. If this were not done, the full braking force required for a fully loaded car would cause the wheels of an empty car to slide, or conversely the full braking force required for an empty car would be insufficient to quickly and safely stop a fully loaded car.

The car body is normally isolated from the trucks by means of an air spring which serves several functions. The air spring mechanism will maintain the height of the car body a fixed distance above the tracks and the loading platform regardless of the load in the car. This is accomplished by varying the pressure of the air spring mechanism in accordance with the change in the load carried by the car body. The variable air pressure present in the air spring 51 may then be used to provide a proportional indication of the load carried by the vehicle itself. This variable pressure is used to pilot a variable control valve 53, which will vary the amount of pressure supplied to the blending control valve means 44-46.

Variable load control valve 53 has a minimum threshold output equal to the brake cylinder pressure required to provide a full brake on an empty car, and this value of pressure is supplied to the blend control valves 44-46 in the absence of air spring pressure or any time that air spring pressure is below a value corresponding to the empty car condition. When the air spring pressure is at a value above the minimum required for an empty car, the output of variable load control valve 53 will rise above the threshold by an amount proportional to the rise of air spring pressure above that required for an empty car.

Relay valve 52 isolates supply reservoir 49 from the blending control valves 44-46. This valve provides a 1:1 repetition of the pressure determined by the variable load valve 53 and is necessary because the blending control valves 44-46 may demand a greater volumetric flow of air than could be supplied directly by the variable control valve 53.

The brake system of the present invention also provides a hand brake or parking brake system which is energized through a separate control system. This is accomplished by a second fluid motor means in each of the pneumatic to hydraulic converters which restrains a spring motor means for actuating the hydraulic portion of the hydraulic converter. This second fluid means is normally energized and connected to a hand brake release valve by means of hand brake piping 54-55 represented by the dashed line in FIG. 1. When it is desired to apply the hand brake or parking brake, the hand brake release valve 55 is energized, thereby venting the pressure in line 54a to atmosphere. This allows the spring motor means in the pneumatic to hydraulic converters 38-40 to energize the hydraulic motor and brake cylinders 32-37. This application may be accomplished through control line 15, or by hand venting the hand brake release valve 55a. This feature also provides a potential "last ditch" braking capability. The parking brake may also be manually released with a wrench at each of the converters 38-40.

The braking system of the present invention is also provided with a wheel slip or skid detection system comprising wheel slip detectors 56, 57 and 58, logic circuitry 27, and wheel slip dump valves 59, 60 and 61. The logic circuitry 27 will detect differences in speed between the axles on trucks A, B, and C, to signal for a reduction in either the dynamic brake system, or the friction brake system. The wheel slip logic circuitry is tied to the dynamic brake controllers by means of circuits 22 and 23 and is tied to the friction brake system by means of dump valves 59-61. The requirements for fail safe operations are met through having normaly de-energized relays to provide the circuit connections between the wheel slip logic 27 and the dynamic brakes 28 and 29, and normally de-energized dump valves 59-61. The logic control circuitry further provides electrical timing means for the dump valves which prevents their remaining open for more than a set period after energization. Thus, when a skid is detected, the dump valves are energized, and release the pneumatic pressure in the pneumatic to hydraulic converters on the slipping truck. The converter on the affected truck, 38, 39, or 40, is vented for the length of time necessary to correct the slip but may not remain vented for longer than the set period before the pressure is reestablished.

The wheel slip detectors 56-58 utilize signal inputs from four magnetic pickup sensors. The logic circuitry 27 amplifies, shapes and compares the low level signal pulses from the wheel slip detectors. While the detection system will operate to produce a spin or slide indication when any axle is rotating at a speed different from that of any other axle by more than a small amount, there is also a provision to detect situations in which all wheels slide simultaneously at synchronous speeds. This is done by detecting the change in rate of angular acceleration. The system measures the acceleration of one axle and when triggered will cause the detector to operate and send a dump signal to a single dump valve. The dump valve operation will correct the skid for only one truck, but as soon as that truck begins to correct its slide, the synchronism is broken and the other detectors will actuate their respective dump valves.

The braking system of the present invention also includes an emergency mode of application. A magnet valve in the blending control valves 44, 45 and 46 is de-energized to completely vent the pilot or control pressure in the blending control valves. This allows the blending control valve to open and permits the entire pressure present in the input manifold 62 to pass through the valve to the pneumatic to hydraulic converters 38–40.

The system also includes a service brake cut out valve 63 for completely de-energizing the friction brake system. This cut out valve is used for towing and/or completing the mission in the event of malfunction of one of the braking systems. Manual cut out valves 63a, 63b and 63c are also provided to each truck on a per truck basis.

THE VARIABLE LOAD SYSTEM

Figure 2:
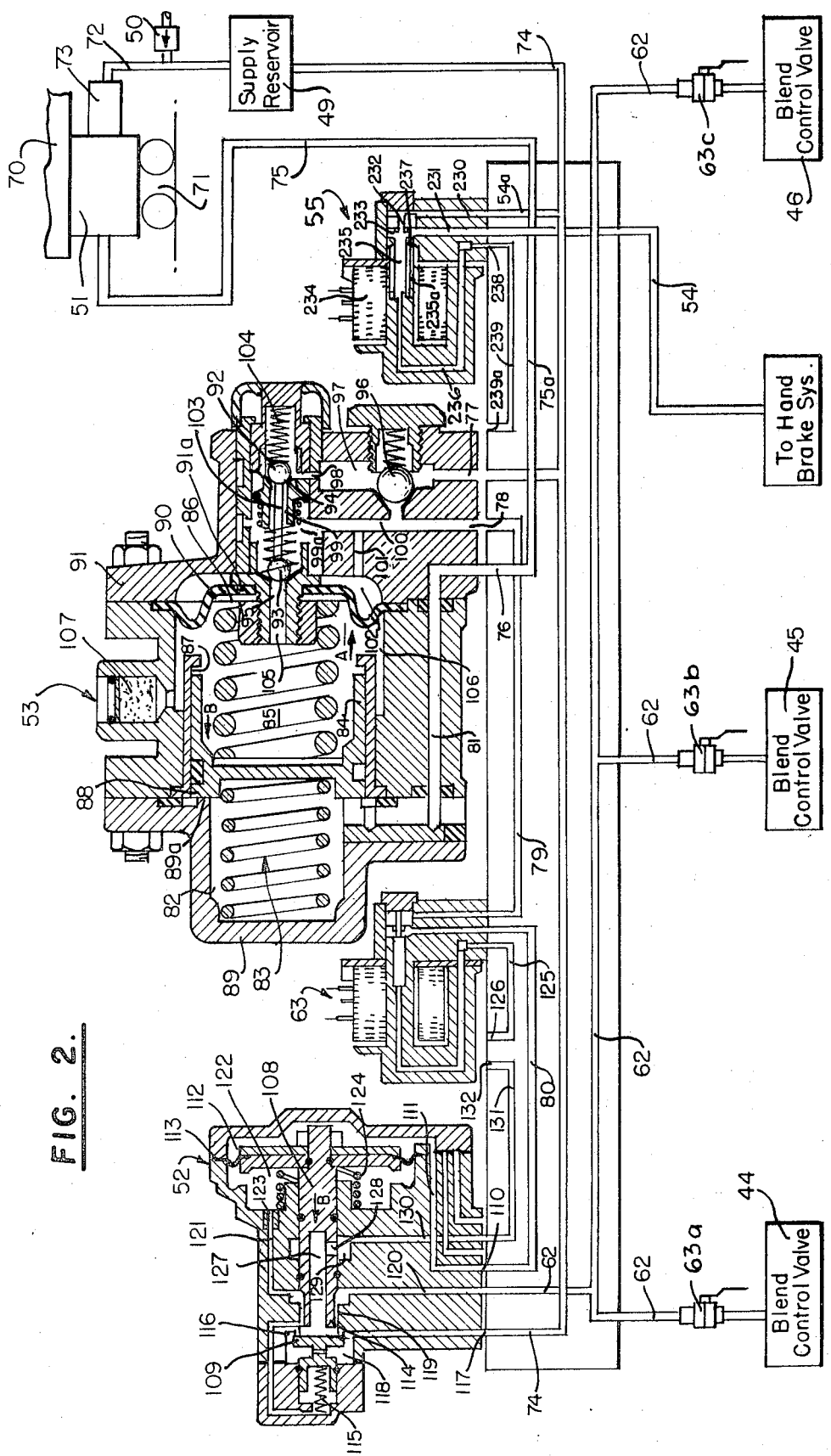
FIG. 2 is a cross sectional diagrammatical view of the air pressure control manifold, the air spring, the variable load valve, the relay valve, and the hand brake control valve.

The variable load system and its associated manifold are illustrated diagrammatically and in cross section in FIG. 2. The components of the variable load system are fully described in my U.S. Pat. No. 3,730,597 entitled "Variable Load Brake Control Apparatus" filed July 16, 1971, the contents of which are incorporated herein by reference. The variable load system is regulated by an air spring mechanism which supports the car body 70 on its truck 71. The air spring mechanism 51 is intended to maintain the height of the car body at a fixed distance above the platform or rails to assist passengers in boarding or alighting from the vehicle. As the load of the vehicle increases, the air pressure in the air spring must be increased if the constant height is to be maintained. This increase in air pressure is provided by piping 72 and regulator 73. As the load of the vehicle goes up, the air pressure in the air spring must also go up to maintain the car body at a constant height. The variance in air pressure in air spring 51 between an empty load and full load is used to regulate the variable control valve 53. There is one significant problem which arises in attempting to adopt the air spring device for the new rapid transit or mass transit cars. Since these cars are relatively light weight in construction, and carry relatively high loads, their load ratios cover a substantial range.

The air spring mechanism 51 is usually in the form of one or more flexible bags located between the car body and the trucks. The regulating valve mechanism 73 is actuated in response to vertical movements of the car body caused by variations in the load of the car body to selectively increase or decrease the pressure in air spring 51. Thus, if the load on the car body increases, the car body moves downwardly towards the trucks and actuates regulating valve mechanism 73 to increase the pressure in air spring 51. This increase in pressure then raises the car body back to its original predetermined height above the platform or rails. Conversely, if the load on the car decreases, the car body rises with respect to the trucks and actuates regulating valve mechanism 73 to decrease the pressure in the air spring 51 which in turn lowers the car back to its original predetermined height.

The variations in pressure present in air spring 51 are used to regulate the variable load control valve 53 illustrated in FIG. 2. As illustrated in FIG. 2, incoming air from the main reservoir passes through check valve 50, and enters supply reservoir 49 and regulator 73. Air pressure from supply reservoir 49 passes through manifold 74 to the hand brake cut out valve 55, variable load valve 53, and relay valve 52. The variable load system provides air to the blending control valves 44, 45 and 46 from reservoir 49 through relay valve 52. The incoming air pressure present on manifold line 74 passes through the relay portion of relay valve 52 and exits into manifold 62. The purpose of the variable load valve and the relay valve is to regulate the pressure of the air present in manifold line 62 and to provide an increase in the available volumetric flow of air to the blend control valves (44–46) over that which would be available if only the variable load valve alone was used to supply these valves.

The variable load valve receives a pilot pressure from the air spring via conduit 75, which enters the manifold and is conveyed to inlet passage 76. Simultaneously, operating pressure from the supply reservoir 49 is supplied to the relay portion of variable load valve 53 through entry port 77, and is conveyed to the control portion of relay valve 52 via exhaust port 78, manifold line 79, cutout valve 63, and manifold line 80.

Variable load valve 53 is illustrated in an "empty" configuration. That is, the minimum amount of pressure is presented to the pilot portion of valve 53 via air spring 51. This minimum air pressure is conveyed to the variable load valve through conduit 75, manifold passage 75a, inlet port 76, and inlet passageway 81, to the pilot chamber 82. This pilot pressure together with spring means 83 exerts a force acting in the direction of arrow A on the bottom of piston 84. Balancing this force is a force acting downwardly on the top of piston 84 exerted by spring 104 through retainer plate 86 and spring means 86. This same force is also exerted by spring 85 on retainer plate 86. Since the opposing forces of spring 85 are balanced, the piston is at rest at a predetermined location within the guide bore 87.

When the car is empty, the pilot pressure in chamber 82 is at its minimum, and the piston 84 will rest with its shoulder portion 88 in immediate abutment with the shoulder 89a of lower cap member 89. If the pressure in chamber 82 were at its maximum as in a fully loaded condition, the piston 84 would be driven in the direction of arrow A to cause the retainer plate and control diaphragm 90 to abut the shoulder 91a of upper cap 91.

The relay portion of the variable load valve comprises supply valve 92, exhaust valve 93 and their associated valve seats 94 and 95. As illustrated in FIG. 2, supply valve 92 is open and air pressure entering inlet passageway 77 passes upwardly through check valve 96 and into chamber 97. From chamber 97 it enters the relay valve through transverse port 98 and passes between the supply valve 92 and its seat 94 to coaxial bore 99. From bore 99, it enters chamber 99a and exits through exhaust passage 100 and exhaust port 78. Air pressure in exhaust passage 100 will simultaneously traverse through interior port 101 to the control chamber 102 immediately above diaphgram 90.

The inlet and exhaust valves 92 and 93 are linked together by means of pin 103. As illustrated in FIG. 2, exhaust valve 93 is firmly seated against exhaust seat 95 by means of spring 104. At the same time, the interconnecting pin 103 has lifted input valve 92 from valve seat 94 to open the relay portion of the valve.

As the air pressure from supply reservoir 49 passes through the relay valve portion of variable load valve 53 it pressurizes chamber 102 until the pressure therein is sufficient to compress spring 85 and move diaphragm 90 and retaining means 86 to the left as indicated by arrow B. As retaining means 86 is moved to the left, exhaust valve 93 is driven to the left by pin 103, supply valve 92 and spring 104. When the pressure in chamber 102 has reached a predetermined level, supply valve 92 will seat against 94 and close coaxial bore passage 99.

The amount of air pressure now present in exhaust port 78, exhaust line 79 and the relay line 80 will be reproduced by the relay valve 52 in the output manifold 62 as will be hereinafter explained.

As the vehicle is loaded, the air pressure present in air spring 51 will increase, and consequently the air pressure present in conduit 75, inlet port 76, inlet passage 81, and pilot chamber 82 will also increase. As this pressure increases, the pressure on piston 84 and the force of spring 83 will combine to move piston 84 to the right in the direction of arrow A. As piston 84 moves in the direction of arrow A, it will move spring means 85 and retaining means 86 to the right. Retaining means 86 will then unseat supply valve 92, allowing additional pressure to be transmitted to relay valve 52 and control chamber 102. Eventually, as piston 84 is moved to the right, the retaining means 86 will move into abutment with shoulder 91a of end cap 91. Any subsequent increases in pressure will only result in a further compression of spring 85. It should be noted that at this point, the pressure required in chamber 102 to move the diaphragm 90 and retaining means 86 to the left as indicated by the arrow B will be substantially greater than it was for the empty car. The pressure in chamber 102 must rise to a force sufficient to overcome combined forces of spring 85 and/or spring 83 and the pressure in chamber 82 to reseat the supply valve 92. When such equilibrium is reached, the supply valve 92 will again close, shutting off passage 99.

It should be noted that the spring constants of springs 83 and 85 are very important. As discussed previously the pressure in air spring 51 varies according to a first relationship determined by the ratio of the load to the weight of the car body only, and not the rail vehicle itself. The pressure delivered to the relay valve 52 varies however, according to a second and different relationship determined by the ratio of the load to the total weight of the vehicle. Accordingly, full braking pressure need not vary as greatly as the air spring pressure. In the preferred embodiment of the invention, the effective area of piston 84 and diaphragm 90 are substantially equal. The spring constant of spring 85 however is larger than that of spring 83 by an amount which causes the full service brake pressure to vary in accordance with the second relationship, even though the air spring pressure varies according to the first relationship.

It should be pointed out that the pressure in air spring 51 will increase and decrease incrementally at each stop as passengers enter and leave the vehicle. If the load 70 is increased, regulating valve 73 will provide additional air pressure to air spring 51 to bring the body to a predetermined distance above the tracks or station platform. When this additional pressre is imposed within air spring 51, it is transmitted through pipe 75, inlet port 76, and inlet passage 81, to pilot chamber 82. This increase in air pressure will cause an additional movement of piston 84 to the right as indicated by the arrow A. This movement will also cause a movement of retaining means 86 to the right which will lift supply valve 92 from its seat 94. At this point, additional air pressure will flow from the inlet passage 77 through the coaxial bore 99 and back out the outlet passage 78. Simultaneously, the air will flow through passage 101 to control chamber 102 until the pressure in control chamber 102 is sufficient to move the retaining means 86 in the direction indicated by arrow B to again reseat valve 92.

If the load of the vehicle is decreased, regulating means 73 will exhaust air from the air spring means 51. When pressure is reduced in the air spring 51, it is correspondingly reduced in pipe 75, inlet passage 76, and pilot chamber 82. As the pressure is reduced, the piston means 84 will move to the left as indicated by the arrow B and the control pressure already present in control chamber 102 will move the diaphragm 90 in retaining means 86 to the left as indicated in the arrow B. Since exhaust valve 93 is restrained in a fixed position by means of linking pin 103, and the seating of valve 92 upon valve seat 94, exhaust valve 93 will be upseated from its valve seat 95, and the excess pressure in control chamber 102 will be allowed to flow through the axial bore 105 into chamber 106 and out exhaust passage 107. This also serves to reduce the pressure in passageway 101, exhaust passage 78, manifold lines 79 and 80 and relay valve 52. When the control chamber 102 has been sufficiently vented, the spring 85 will overcome the pressure in chamber 102 and will again move retainer means 86 to the right as indicated by the arrow A, and cause valve seat 95 to engage exhaust valve 93. As can be seen from the foregoing description, variable load valve 53 produces a variable pressure that is partially proportional to the pressure present in air spring 51, and the load carried by the vehicle. This difference in spring constants between spring 83 and spring 85 is provided to provide for the difference in load-to-weight ratios between the load and the car body as opposed to the ratio between the load and the weight of the vehicle. These pressures are reproduced in the friction brake control system by relay valve 52 in the following manner.

Relay valve 52 is a high capacity diaphragm operated self-lapping relay valve having an O-ring piston 108 and a double seated rubber check valve disc 109. Its function is to supply and exhaust the control air pressure for the friction brake system during brake application and releases. The relay valve is intended to provide the blending means with a pressure approximately equal to that developed by the variable load valve 53 in manifold line 80 and input port 110. As pressure rises at input port 110, it is conveyed through interior passageway 111 to the pilot chamber 112 on the right side of diaphragm 113. The air pressure developed in chamber 112 causes diaphragm 113 and piston 108 to move to the left as indicated by the arrow B until the end of the piston stem 114 contacts and then seals against the underside of the rubber check valve disc 109.

Spring member 115 normally urges check valve 109 to a closed position against seat 116. Further pressure in chamber 112, will cause further movement in piston 108, which will cause the rubber check valve 109 to be lifted off seat 116, opening a connection between supply reservoir line 74, coaxial chamber 119 and output passageway 120. The initial charge of air from the supply reservoir will pass through line 74 in the manifold, through inlet port 117 to chamber 118. When valve seat 109 is lifted, the pressure then flows through the coaxial passage 119 between the piston and the body of valve 52 to the output passage 120 and output manifold 62. This air pressure is also conveyed by means of inner passageway 121 through choke 123 to spring chamber 122 on the other side of diaphragm 113. The purpose of choke 123 is to damp out any pressure waves which might cause transient unseating of piston 108 and valve 109. As the pressure builds in chamber 122, it begins to equalize the pressure present in chamber 112. When the equalization is reached, spring means 124 will move piston 108 to the right, causing valve disc 109 to lap on valve seat 116, thereby shutting off any further passage of air between inlet line 74 and output manifold 62.

The relay valve functions to maintain a constant pressure in delivery manifold 62. If brake cylinder or systems leakage should cause the pressure to decrease, the pressure in spring chamber 122 will also decrease, and the pressure maintained in pilot chamber 112 will cause movement of the piston 108 in the direction of arrow B. This will cause a second unseating of valve disc 109, and a second charge of air will be transmitted from input line 74 to delivery manifold 62. When equalization with the control pressure in chamber 112 is again reached, the piston and diaphragm assembly will again be moved to the lap position cutting off further flow of air from the supply reservoir to the delivery manifold 62.

In the event of a malfunction of the friction brake system, it may be desirable to disengage the entire friction brake system to enable the vehicle to be towed, or to enable one car of the train to complete its mission, until repairs can be made. The friction brake system may be completely cut out by actuating release valve 63. Release valve 63 normally provides a through passage between manifold line 79 and manifold line 80. When it is energized, it exhausts manifold line 80 through valve 63 to exhaust passageway 125. When the air in manifold line 80 is exhausted, the pressure present in pilot chamber 112 will also be exhausted. As this occurs, spring means 124 will move diaphragm 113 to the right. This movement seats valve disc 109 on seat 116 and unseats the disc from the exhaust seat 114 of piston 108. When the exhaust valve is unseated, manifold pressure in line 62 is then free to flow from the manifold line 62 through axial bore 127, radial port 128, chamber 129 and out through exhaust line 130. Exhaust line 130 is connected to exhaust manifold 131 and exhaust port 132. Thus the actuation of cutout valve 63 will effectively exhaust all air pressure present in the supply manifold 62.

BLENDING CONTROL VALVE

The blending control valve system of the present application provides proper blending of the braking efforts of the dynamic and friction braking systems. According to the present invention, this system uses the dynamic brake as the primary brake and energizes the friction brake only when the dynamic brake is incapable of producing the selected braking effort and then only to the extent necessary to satisfy the deficiency. Each car in the system carries a blending valve means which responds to the sum of currents in the electrical control system and in a resistance means located in the dynamic brake circuit. The blending control valve produces an output pressure which increases as the sum of the currents decreases from a prescribed level. The blending control valve means utilizes many of the components described and illustrated in my U.S. Pat. No. 3,536,361 entitled "Blending Scheme for Current Responsive Railway Brake," the disclosure of which is incorporated herein by reference. The blending action of the control valve is balanced by a pneumatic feed back device which affords an opposing effect that decreases as the pressure applied to the friction brake system increases. The blending control valve also includes a supply and exhaust valve that takes the input from the input manifold 62 and either exhausts the pressure to atmosphere through an exhaust port or conveys it to the actuator for the friction brake.

Each of the blending control valve means employed in this system includes 5 main components. The first two components are a pair of electrical torque motors 134 and 135. Motor 134 responds to electrical current variations in control line 11 and motor 135 responds to current imposed across a resistance means 136 located in the dynamic brake circuit 31. These torque motors exert additive, proportional torques, on a comparator shaft 137. The third component is a pneumatic torque motor 138 which applies to shaft 137 a resisting torque which decreases linearly with increases in the pressure applied to the friction brake system through output line 139. The fourth component comprises a pilot valve assembly or pressure transducer 140 which is driven by shaft 137. It serves to control the pilot pressure in a pair of pilot passages 141 and 142. The fifth component comprises the supply and exhaust valve assembly 143 which serves to regulate the input pressure from manifold 62 to the friction brake system in accordance with the pilot pressures produced in lines 141 and 142.

Each of the electrical torque motors 134 and 135 is of known design and comprises a permanent magnet rotor which rotates within a wound stator. The direction in which the motor rotates depends upon the direction of current flow through the stator, and the motor circuits are so correlated that both always rotate in the same direction. The torque output of each motor is directly proportional to the magnitude of the current and the size of the magnetic angle between adjacent unlike poles of the rotor and stator.

The output of these torque motors is connected directly to pneumatic torque motor 138. The operation of this torque motor is fully explained in my previous U.S. Pat. No. 3,536,361, the disclosure of which is incorporated herein by reference. This torque motor provides a countervailing or balancing torque on shaft 137. When the pressure in output line 139 is at zero, pneumatic torque motor 138 is applying its maximum torque output to shaft 137. Conversely, when a full service application is made, torque motor 138 applies a minimum torque. The force exerted on shaft 137 varies inversely with pressure, and is a negative function of transducer output pressure.

Pneumatic transducer 140 uses the combined output on shaft 137 to vary the pilot pressure supplied to the main supply and exhaust valve 143. The pneumatic transducer receives incoming pilot pressure from manifold 62 and pressure reducing valve 143. The pressure reducing valve 140 provides a reduced pressure at the inlet point 144 for pneumatic transducer 140. The pneumatic transducer responds to torque input on shaft 137 to provide three output conditions:

a. In the normal or application position, the transducer vents pilot pressure from the pilot passages 141 and 142.

b. At the extreme limit of angular rotation of shaft 137 pilot pressure is supplied to passages 141 and 142 and the transducer is in its released position.

c. In an intermediate position between *a* and *b* above, pilot passage 141 is pressurized and pilot passage 142 is vented. Any angular rotation out of this intermediate position, in the direction toward the limit of travel, will establish pressure in pilot passage 142 and operate the release valve to decrease pressure output, while rotation in the opposite sense, that is, toward the normal position will cause both pilot lines to be vented.

The main supply and exhaust valve 143 includes poppet-type supply and exhaust valves 145 and 146 arranged to control flow from the main inlet input manifold 62 to the main brake control line 139 or to exhaust port 148 and the surrounding atmosphere. Supply and exhaust valves 145 and 146 are carried by spool portions 150 and 150a which reciprocate in axially aligned bores and are arranged so that if either valve (145 or 146) move in either direction, it engages the other, and causes it to move in a valve closing direction. The opposite ends of each spool have equal cross sectional balancing areas and are interconnected by passages extending through the spools. This renders both valves insensitive to changes in transducer outlet pressures. The supply and exhaust valves 145 and 146 are biased closed by compression spring 149 which is interposed between them. Each of the valves 145 and 146 may be shifted in its respective opening direction by first and second pilot motor means comprising compression spring 150 and diaphragm 151 (for valve 145) or by compression spring 152 and diaphragm means 153 (for valve 146). It should be noted that the corresponding parts of the two pilot motor means are reversed so that in one case the valve (145) is opened by the spring and in the other the valve (146) is opened by the diaphragm motor. The arrangement of the parts is such that:

a. Spring 150 opens supply valve 145 and holds exhaust valve 146 closed when the pilot passages 141 and 142 and diaphragm motor chambers 154 and 155 are vented.

b. Diaphragm motor means 153 will open exhaust valve 146 and hold supply valve 145 closed when both diaphragm motors are pressured.

c. Spring means 149 will close both the supply and exhaust valves when diaphragm motor chamber 154 is pressurized and diaphragm motor chamber 155 is vented.

These three conditions of the supply and exhaust valve 143 correspond directly to the three positions of the pneumatic transducer 140 referred to above.

Application of the dynamic brake and the friction brake may be accomplished through control circuitry 11. In the preferred embodiment of the invention, control circuitry 11 carries a constant voltage of 20 volts. A reduction in the voltage carried on control circuitry 11 will effect a brake application. The application is proportional to the reduction in voltage below the 20 volt standard. For example, if the control circuitry voltage was zero, a full brake application would result. On the other hand, a ten volt reduction would produce a proportionally smaller brake application. In the embodiment that is illustrated in FIG. 1, each of the friction brakes at trucks A and C is equipped with a blending valve which serves to correlate the effective braking force of the dynamic brakes and the friction brakes. As shown, truck B applies only friction braking, however, dynamic brakes may also be provided. The blending means operates essentially in an additive manner with the control system signal present on line 11. Thus, if the control system voltage were reduced to zero, but the dynamic braking means indicated a 20-volt output from the dynamic brake controller, the blending means would provide no friction brake output. On the other hand, if in the above example the dynamic brake voltage output was only 18 volts, the net voltage reduction of 2 volts would produce a friction brake pressure of approximately 10 percent of a full brake application. This would be the amount required to produce a fully effective blended service brake application.

The blending means serves only to correlate a proportional amount of service brake application to complement the dynamic braking. The variable load valve senses the air spring pressure and produces an output pressure of a certain predetermined minimum threshold value, or a value proportional to the amount of loading of the vehicle above this threshold.

It should be noted that control system 11 is interconnected to the other cars of the train to effect uniform reduction and uniform braking for each of the cars. This may be accomplished in any one of several ways. A single control line may extend throughout the train, and supply the operating voltage for each of the torque motors 134 for each blending means. In an eight-car train, there would normally be either 16 or 24 blending control valves drawing current from the control system 11. Alternately, it would be possible to utilize a control line which would operate an amplifier in each car whose outlet would in turn supply the operating voltage for torque motors 134 and controller 31.

Figure 3:
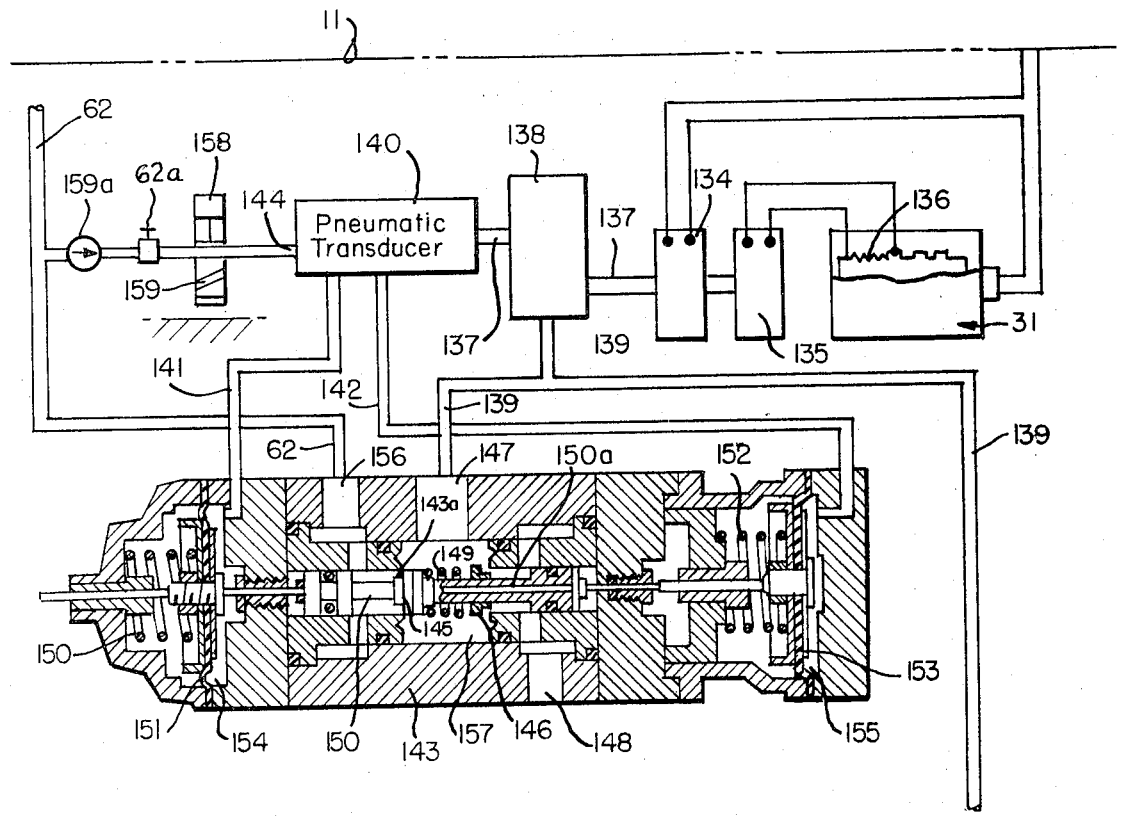
FIG. 3 is a cross sectional and diagrammatical view of the blending means of the present invention.

When the brake system of FIG. 3 is in use, and propulsion controller is set in a motoring position, the circuits of the dynamic brake controller 31 will be in the motoring configuration and resistance means 136 will be isolated from the traction motors, and electrical torque motor 135 will develop no torque. If the voltage in the control system 11 is at its maximum, the torque output of motor 134 will be at a maximum, and its motor will maintain the comparator shaft 137 in a release position for transducer 140. All of the components of the supply and exhaust valve 143 will assume their illustrated positions and the brake cylinder line 149 will be vented to atmosphere through port 148.

In order to apply the brakes, the operator shifts the propulsion controller to a coast position, thereby reducing the voltage in control system 11, and switching the circuits of dynamic brake 29 to a braking configuration to establish a dynamic braking effort. This change in current reduces the torque output of electrical motor 134 and causes controller 31 to decrease the armature circuit resistance of the traction motor. Since the traction motor now acts as a generator, it supplies voltage to resistance means 136. Electrical torque motor 135 will now apply to comparator shaft 137 a torque which is proportional to the voltage across the impedance means 136. The output of torque motor 135 will also urge shaft 137 towards a release position. The increase in the torque output of motor 135 may be greater or less than the decrease of the torque output of the motor 134. If the dynamic brake itself can satisfy the braking command, the torque developed by motor 135 will exceed or equal the reduction in the torque output of motor 134, and the comparator shaft 137 will remain in the extreme release position. In this case, the pneumatic transducer 140 will remain in a release position with pilot lines 141 and 142 pressurized and brake line 139 vented. If on the other hand, the dynamic brake is incapable of supplying the braking effort called for by control system 11, the torque output of motor 135 will not offset the reduction in the torque output of motor 134, and the pneumatic torque motor 138 will rotate comparative shaft 137 towards the apply position. This would be the case at truck B as illustrated. As shaft 137 rotates towards the apply position, pneumatic transducer 140 will vent the pressure present in pilot lines 141 and 142, and consequently the fluid pressure present in chambers 154 and 155. When this pressure is vented, spring means 150 will open valve 145, and simultaneously close exhaust valve 146. When valve 145 is moved from seat 145a it opens communication between inlet passage 156, bore chamber 157 and outlet chamber 147, establishing communication between input manifold 62 and brake line 139. Since the exhaust valve 146 has been closed, air pressure will now be supplied to the friction braking means through brake line 139. As the pressure in 139 develops, the torque output of pneumatic torque motor 138 will be reduced, and the torque which it applies to comparator shaft 137 will be reduced. Accordingly, as the braking effort of the friction brake means approaches the level required to compensate for the deficiency in the output of the dynamic brake means, the electrical torque motors 134 and 135 will begin to rotate comparator shaft 137 toward the intermediate or lap position. When the sum of the outputs of the friction and dynamic braking means is equal to the selected braking effort, the torques exerted on shaft 137 will be balanced, and pressure transducer 140 will rest in an intermediate or lap position.

In the lap position, pilot passage 141 is pressurized while pilot passage 142 is vented. As the pneumatic transducer moves to its lap position, the working pressure in chamber 154 will increase, and thediaphragm motor means 151 will overpower spring 150 allowing spring means 149 to close the supply valve 145.

The voltage impressed across impedance means 136 varies directly with the braking effort of dynamic brake means 29, and as is known in the art, this effort commonly is at a maximum at an intermediate train speed. In view of this, it should be evident that for any given reduCtion in the control voltage on control system 11, the torque output of motor 135 may either increase or decrease during the period of the brake application. If the brake is operating in the high speed range when the brakes are applied, the effectiveness of the dynamic brake 31 will increase during the initial period of retardation and, if an application of the fluid operated friction brake was necessary originally to satisfy the braking command, the blending valve means will operate to reduce the pressure in the friction brake means as the train speed decreases and the dynamic braking increases. This effort is initiated by electrical torque motor 135 which, in response to the rising current across impedance means 136 will unbalance the torques acting on comparator shaft 137 and will shift the pressure transducer to a release position. When this happens, pilot line 142 will be pressurized and will supply pilot pressure to chamber 155 to actuate diaphragm motor means 153. Diaphragm motor means 153 will then serve to open exhaust valve 146 establishing communication between brake line 139, output chamber 147, counterbore chamber 157 and exhaust port 148. As the air escapes from the friction brake means through passage 139, the pressure developed in the pneumatic torque motor 138 will decrease. As was pointed out previously, the pneumatic torque motor 138 supplies its maximum torque when the pressure in brake line 139 is at a minimum, and develops its minimum torque when brake line pressure it at its maximum. Therefore, as the braking force developed by the friction brake decreases to offset the increase in dynamic brake output, the pneumatic torque motor 138 returns the pneumatic transducer to a lap position. As long as the effectiveness of the dynamic brake continues to increase, the pneumatic transducer 140 will continuously bleed air from the brake line 139 in the manner hereinbefore just described and thereby gradually reduce the braking effort of the pneumatically controlled friction brake means.

After train speed has been reduced to a low level, the braking effort on the dynamic brake means will begin to "fade." This will reduce the amount of voltage impressed upon impedance means 136, and the torque generated by motor 135. When the train enters this portion of the braking cycle, the torque acting on comparator shaft 137 will again become unbalanced in the opposite direction and pneumatic torque motor 138 will shift the pressure transducer to an application position. This position will vent both of the working spaces 154 and 155 through pilot control lines 141 and 142 and allow spring means 150 to open supply valve 145 and close exhaust valve 146. Air under pressure will now be supplied through inlet port 156, bore chamber 157 and exhaust port 147 to brake line 139. As the pressure rises in brake line 139, the increased pressure will effect a reduction in the torque output of pneumatic torque motor 138. When the braking effort of the pneumatically operated friction brake is increased sufficiently to offset the decrease in the output of the dynamic brake due to "fade" the torque motors 134 and 135 will return the pneumatic transducer to a lap position.

In view of the foregoing discussion, it should be evident that, regardless of the effect of speed on dynamic braking effort, the invention will always graduate the friction braking effort as needed to maintain the total braking effort required.

The blending means also includes an emergency mode of application whereby a separate electrically operated solenoid valve 158 is operative to vent the supply pressure for pneumatic transducer 140. When the input for the pneumatic transducer 140 has been vented, the pilot pressure in 141 and 142 will also be vented and spring means 150 will open supply valve 145 and close exhaust valve 146. Thus, the operation of the emergency valve 158 will result in a full service application of the friction brake means, regardless of the amount of braking effort being applied by the dynamic brake means. In order to ensure that the system is fail safe, valve 158 is energized to its through position illustrated in FIG. 3. In the through position, it interconnects the pressure from pressure reduction valve 143 to transducer 140. When actuated, the exhaust port 159 will vent to atmosphere the control pressure within pneumatic transducer 140. Check valve 159a prevents any loss of service pressure through emergency valve 158 when an emergency application is made. Since valve 158 is normally energized, a complete electrical failure will effect a complete application of the friction brake subsystem.

PNEUMATICALLY CONTROLLED FRICTION BRAKE

Figure 4:
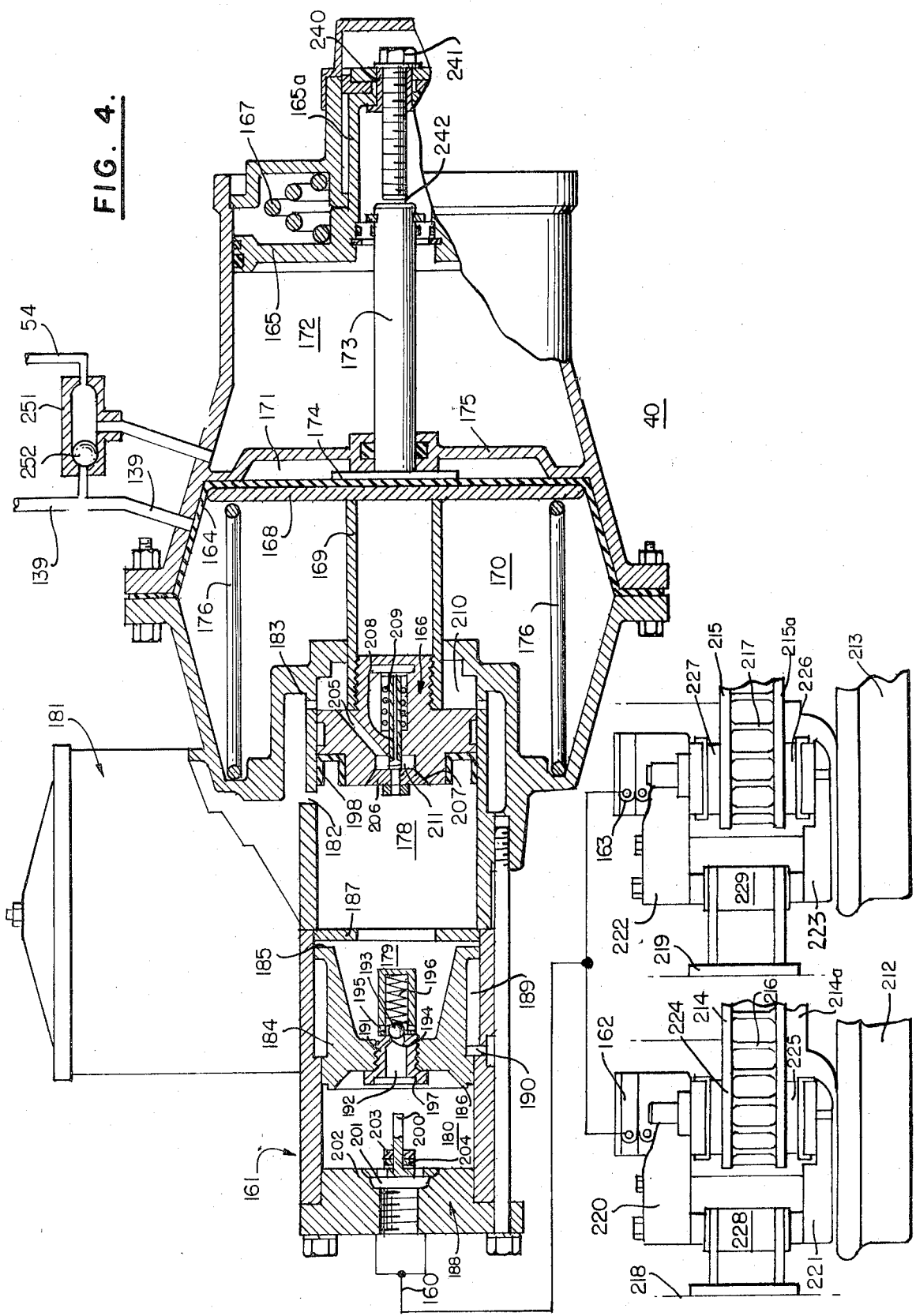
FIG. 4 is a cross sectional and diagrammatical view of the pneumatic-to-hydraulic converter, the slack adjustor, and the spring motor used to actuate the hand brake.

FIG. 4 is a cross sectioned and diagrammatical representation of the friction brake subsystem of the present invention. This subsystem comprises a pneumatic-to-hydraulic converter generally designated as 40, the pneumatic control input line 139, hand brake control line 54, a hydraulic slack adjuster 161, a hydraulic brake line 160, and hydraulic disc brakes 162 and 163. The pneumatic-to-hydraulic converter has a first and second fluid motors 164 and 165 and a hydraulic motor 166. The converter also employs a spring motor 167 which is restrained by the action of the second fluid motor 165. The converter is responsive to positive variations in pressure to actuate the first fluid motor 164. The spring motor 167 is also responsive to reduCtions in fluid pressure in the second fluid motor to actuate the hydraulic motor 166.

The first fluid motor means comprises flexible diaphragm 164, piston 168, push rod 169 and chambers 170 and 171. As chamber 171 is pressurized, the flexible diaphragm 164 exerts pressure on piston 168 forcing the push rod 169 and hydraulic piston 166 to the left. The second fluid motor comprises chamber 172, piston 165 and a second push rod 173. Piston means 165 is slidably mounted on push rod 173. The rear portion 165a of piston 165 has fitted therein a threaded collar 240 and an adjustable bolt means 241. The adjustable bolt 241 bears against push rod 173 as indicated at 242 to couple piston 165 to push rod 173. Push rod 173 is in turn coupled to piston 168 and diaphragm 164 by means of pressure plate 174. Push rod 173 extends through the intermediate wall 175 which divides the converter into first and second fluid motor portions. Spring motor means 167 exerts a constant bias on piston 165 urging it to the left as illustrated in FIG. 4. The air pressure present in chamber 172 acts as a restrainer to prevent the spring motor means 167 from exerting any pressure on piston 165 and push rod 173. A hand brake actuation is accomplished by venting or releasing the pressure in chamber 172 which in turn allows spring motor means 167 to energize hydraulic piston 166 through piston 165, bearing plate 174, and push rod 169. The hand brake may be manually released by turning bolt 241 with a wrench as will be hereinafter explained.

Release of the first motor means 164 is accomplished by venting the brake cylinder pipe 139 through the supply and exhaust valve 143 illustrated in FIG. 3. As chamber 171 is vented, spring means 176 will exert a force to the right on piston 168 to return it to the position illustrated in FIG. 4. If the spring motor means 167 has been actuated by venting the pressure in 172, it is necessary to restore the fluid pressure in chamber 172 before the brakes can be released.

The hydraulic motor and slack adjuster comprise three axially aligned stepped bores 178, 179 and 180. The structure and operation of slack adjuster 161 is more fully illustrated and described in my copending U.S. application Ser. No. 302,415 entitled "Hydraulic Slack Adjuster and Brake Circuits Therefor," the disclosure of which is incorporated herein by reference. Hydraulic fluid for the hydraulic motor is stored in reservoir 181, and enters the first hydraulic chamber 178 through port 182. In addition, there is a second port 183 which is provided to permit free flow of hydraulic oil into chamber 210 when the brake is applied, and permit the free return of this oil to the sump when the brakes are released. The operation of this transfer will be hereinafter later explained. In operation, hydraulic fluid completely fills the chambers 178, 179 and 180, together with the hydraulic pressure line 160 and the hydraulic motors 162 and 163. An application of the hydraulic pressure is made by pressurizing chamber 171 and fluid motor means 164. As piston 168 and push rod 169 are driven to the left, piston 166 is moved through its discharge stroke, to displace oil from space 178 into the slack adjuster 161. The maximum output pressure to the hydraulic motors equals the product of the pneumatic pressure supplied to motor 164 and the ratio of the effective area of the diaphragm 164 to the effective area of hydraulic piston 166.

The hydraulic slack adjuster comprises a stepped cylinder having chambers 179 and 180 of differing diameters. A differential area reciprocal piston means 184 having large 185 and small 186 diameter pistons formed thereon is mounted within the cylinder. Piston 184 is limited in its travel by means of stops 187 at the end of the larger cylinder 179 and end cap 188 at the end of the smaller diameter cylinder 180. The intermediate space 189 surrounding piston member 184 is vented to atmosphere through port 190. Throughout most of the piston travel, spaces 179 and 180 are isolated from one another, but during slack adjustment, fluid will blow between the two chambers as will be hereinafter described.

Piston member 184 has threaded therein a valve unit 191 having a cylindrical bore 192, ball valve 193, valve seat 194, radial port 195, and a compression spring 196. The axial bore 192 also defines a check valve seat 197 within chamber 180.

Upon actuation of the service brakes, chamber 171 will be pressurized, and fluid motor diaphragm 164 will cause displacement of the hydraulic piston 166 by means of push rod 169. As hydraulic piston 166 is displaced to the left, gasket means 198 will seal port 182 to prevent the escape of hydraulic fluid back into reservoir 181. Thereafter, the hydraulic fluid in working chamber 178 will be displaced into chamber 179. As this hydraulic fluid is displaced, it will force piston member 184 along its reciprocal path towards end cap 188. In doing so, the hydraulic fluid present in cylinder 180 will be displaced through hydraulic line 160 to hydraulic brake motors 162 and 163. The volume of the chamber 180, and the length of path travel of piston 184 is intended to provide the proper amount of slack adjustment between the brake pads 224–227 and the braking discs 214 and 215. As piston member 184 traverses to the left, ball check means 193 is held on seat 194 by means of the pressure present in chamber 179, and the force exerted by spring 196. This ball check valve may provide a release function and allow flow from space 180 to space 179 if the pressure in chamber 180 exceeds that in 179 by more than a predetermined amount. In the preferred embodiment, spring 196 is selected to permit opening the valve upon development of a differential pressure in the order of 12 psi.

Ball check valve 193 may also be unseated mechanically by a push rod 200 which is carried by spider 201 mounted in the outlet port 202 of end cap 188. This push rod is effective to open the ball valve just before piston 184 reaches the limit of its leftward travel or approximately 1/16 of an inch before the piston abuts cover 188. This permits the flow of hydraulic fluid through axial passageway 192, in response to positive pressure differentials present in chambers 178 and 179. These positive pressure differentials actuate hydraulic motors 162 and 163 to provide friction braking of the vehicle. Since the axial passageway 192 is now open, the pressure developed in hydraulic motors 162 and 163 will be proportional to the pneumatic pressure developed in chamber 171.

Since the relative effective area of piston 185 is greater than the effective area of piston 186, piston 184 will be held in an extreme left hand position by means of the fluid pressure in chamber 179. At the same time, however, check valve disc 203 will be urged into contact with seat 192 by means of spring 204. During the service application of the brakes, the check valve disc 203 will be displaced to the left to allow hydraulic fluid to flow between the legs of spider member 201 into the outlet passage 202. When the service application is terminated, valve disc 203 will be firmly seated within seat 197, and will prevent any passage of fluid through axial passage 192. When the brakes are subsequently released, the pressure in space 178 and 179 must be reduced below the pressure in space 180 by an amount sufficient to offset the differential between the areas of piston portions 185 and 186 before the piston 184 will move back to its initial position. Spring mean 176 will provide a positive displacement of piston 168, push rod 169, and hydraulic piston 166. This positive displacement by means of spring 176 will reduce the pressure in chambers 178 and 179 which will draw piston member 184 to the right as illustrated in FIG. 4. Normally, brake release is effected quickly enough to develop the pressure differential needed to shift piston 184 a sufficient distance to allow ball member 193 to reseat, thereby closing passageway 192. The check valve means 203 will also impede the flow of hydraulic fluid through axial passageway 192 to chamber 179 until piston 184 has been retracted enough to allow ball valve 193 to reseat itself on 194. With this arrangement, the check valve 203 will always prevent flow from space 180 to space 179 whenever the ball valve is held open by means of push rod 200. As a result, the pressure differential required to shift piston 184 to the limiting right hand position will always be developed at the beginning of the brake release regardless of the rate at which pressure in working space 179 or 180 is dissipated.

The slack adjuster operates to compensate for improper adjustment in the following manner. If it is assumed that shoe clearance at the commencement of the application was too small, the amount of hydraulic fluid expelled from working space 179 will be conveyed into hydraulic working space 178 as the hydraulic piston 166 retracts. Hydraulic piston 166 will return to its fully retracted position before slack adjustor piston 184 reaches its limiting right hand position. This however, does not prevent piston 184 from moving to that limiting position because full retraction of hydraulic motors 162 and 163 will fully retract piston 184. As booster piston 166 reaches its fully retracted position, it reopens port 182, thereby allowing the remaining oil to be displaced from working space 179 and 178 into reservoir 181. As a result, the shoe clearance prevailing at the end of the brake release will be determined by the volumetric displacement of the slack adjuster piston 184 through chamber 180. Thus, cycling of the service brake under the assumed condition of too little shoe clearance will cause slack adjustor 61 to increase clearance to the desired value.

In cases where the service brake is applied when shoe clearance initially is greater than desired, slack adjuster piston 184 will reach its left hand limit of motion before hydraulic motors 162 and 163 have brought their pads into contact with the disc. Therefore, in this case, there is no increase in the pressure in working space 180 during the leftward movement of piston 184 and ball valve 193 remains closed until just before the piston 184 contacts end cap 188. At that point, the push rod 200 will unseat ball valve 193 so that additional hydraulic fluid required to take up the remaining shoe clearance and to develop the desired level of braking force can be transferred to the brake cylinder circuit through passage 192. Since the brake application causes piston 184 to move full stroke into engagement with end cap 188, it follows that the subsequent release of the service brake will cause piston 184 to withdraw from hydraulic motors 162 and 163 exactly the same quantity of oil as in the case described earlier. Thus, it follows that in situations where shoe clearance initially it too great, the hydraulic slack adjustor 161 will reduce it to the desired value.

It should be observed that when shoe clearance initially is too great, the quantity of hydraulic fluid displaced from chamber 178 will necessarily be greater than the quantity returned when the brakes are subsequently released. Therefore, during the release, the slack adjuster piston 184 will return to its initial position against abutment means 187 before booster piston 166 has reached its retracted position. Under this condition, oil will be transferred from reservoir 181 through port 183, working space 210, passageway 205 and check valve 206 to chamber 178. Check valve 206 comprises a valve disc having a seat member 207, a stem member 208, and a light coil compression spring 209. Hydraulic fluid is delivered to the check valve through the inclined passageway 205 which interconnects the cylindrical working space 210 with a chamber 211 formed in piston 166 immediately adjacent the upstream end of check valve 206. The angled passageway 205 is so sized that it develops the major portion of the pressure differential required to open valve 206. This design has a desirable side effect in that it affords the designer a convenient way to control the degree of suction which the booster piston 166 applies to the slack adjuster piston 184. Thus, in situations where it is desirable to use the booster suction to augment the retraction forces acting on hydraulic motors 162 and 163, the degree of assistance can be increased or decreased easily by merely reducing or increasing the diameter of passageway 205.

In the preferred embodiment of the invention, the friction brake system employs disc brakes and hydraulic actuators. Although it would be possible to use pneumatic actuators and a conventional brake system, the use of hydraulic actuators and disc brakes provides the precise control needed for a fast response brake system. As illustrated in FIG. 4, each of the wheels 212, 213 is supplied with segmented discs 214 and 215. The discs are segmented to permit assembly on the vehicle axle without pulling the wheel from the axle. The two segments lock together mechanically and are designed so that they cannot be incorrectly assembled. The two segments for each disc are matched and balanced as a set. Each of the sets is provided with two friction braking surfaces (214 and 214a for wheel 212 and 215 and 215a for wheel 213). The two sets of discs are separated by a plurality of radial ribs as illustrated at 216 and 217 which act as sorroco-type blowers which move a large quantity of air through the disc to provide rapid cooling between stops. The caliper-type brake members are mounted to the truck as indicated at 218 and 219 and define a pair of caliper arms 220, 221 and 222, 223 for each brake member. Each of the caliper arms carry friction pads which bear against the discs 214, 214a, 215, and 215a. The calipers are of the floating variety which slide in FIGS. 1 and 2) and 229. This sliding movement enables the caliper brake to follow the disc with each brake application. The hydraulic motors 162 and 163 apply pressure directly to the pads 224 and 227 against discs 214 and 215. This moves the caliper to apply pads 225 and 226 against discs 214a and 215a.

HAND BRAKE AND EMERGENCY CONTROL SYSTEM

The hand brake and emergency control system comprises (referring to FIGS. 1 and 2) a hand brake release air vent valve 55 which is energized to apply a spring loaded brake actuator. The hand brakes are supplied with pneumatic pressure from the supply reservoir through conduit 54. This pressure restrains (referring to FIG. 4) the second fluid motor means 165 located in the pneumatic to hydraulic converter. Line 54 pressurizes chamber 172 and urges piston nember 165 to the right, thereby containing spring motor means 167. When the pressure in chamber 172 is vented, spring motor means 167 will drive the rigid diaphragm 165, bolt 241, push rod and pressure plate 174 to the left. This will cause a simultaneous movement of piston 168, push rod 169, and hydraulic piston 166. The movement of piston 166 will effect the same hydraulic braking as hereinbefore previously described with respect to the pneumatic to hydraulic converter. It should be noted however, that the application of the hand brakes results in a one time brake application which is normally equivalent to the effective force of spring motor means 167 applied across the face of hydraulic piston 166.

A separate emergency dump valve 250 is illustrated in FIG. 1. It is piped in series wih the hand brake dump valve 55, so that the de-energization of either valve will effect an application of the spring motor means 167, and an application of the friction brakes. While one form of emergency brake service was heretofore previously discussed with respect to dump valve 158 and the blending control valve 143 (in FIG. 3), the inclusion of the separate dump valve 250 will insure redundant emergency capability. If wired together, they would provide application through both the service system and the emergency hand brake system.

The present invention also includes a two-way check valve 251 for each hydraulic to pneumatic converter. This check valve is to prevent overapplication of the brakes in an emergency. If the combined effects of both the hydraulic booster and the spring motor were applied to the hydraulic system, the system would lock the wheels of the vehicle and cause skidding which would in effect lengthen the stopping distance required. For example in referring to FIG. 4, if the spring motor means were capable of exerting a pressure on piston 165 equivalent to 100 psi, and the service brake was applying a full service application of 80 psi, the resultant force on hydraulic piston would be equivalent to 180 psi. Two-way check valve 251 will limit the maximum amount of emergency applications to 100 psi, or the maximum equivalent force generated by spring motor means 167.

As illustrated in FIG. 4, two-way check valve 251 is illustrated in its normal position with normal communications established between the pressurized line 54 and fluid motor 172. Fluid conduit 139 and chamber 171 are unpressurized, and ball 252 is shifted to its left position. If only an emergency application or hand brake application is made, ball 252 will remain in its left hand position, and the spring motor means will be energized as chamber 172 and conduit 54 are depressurized. If however, there is a service application in effect when the emergency system is activated, ball 252 will remain in its left hand position until the fluid pressure in line 139 exceeds that in line 54. At that time, ball 252 will shift to the right, cutting communication between the depressurizing line 57 and fluid chamber 172. This will in effect seal a restraining pressurization in chamber 172 equivalent to the pressurization in chamber 171. If 60 psi is present in chamber 171, the check valve will shift as the pressure in chamber 172 and line 54 drop below 60 psi, sealing 60 psi in chamber 172. The 100 psi pressure which would have been generated by spring motor means 167 is reduced by 60 psi, and the total additive effect on piston 166 is 60 psi from chamber 171 and a spring pressure from spring motor 167 equivalent to 40 psi, for a total brake application equivalent to 100 psi.

The interconnection of the hand brake vent valve 55, the supply reservoir and the hand brake system is illustrated in FIG. 2. Air pressure is supplied to the hand brake system from supply reservoir 49 through conduit 74, and branch passageway 54a formed in the piping manifold. The hand brake release valve is energized to release, and when energized will pressurize the line 54. Incoming air from the supply reservoir enters through passageway 230, passes through axial bore 232 to intermediate chamber 233 and exits through exhaust passage 231 to conduit 54. Conduit 54 is in turn connected to each of the second fluid motors located in the pneumatic to hydraulic converters. When the hand brake is applied, solenoid 234 is de-energized, driving plunger 235 to the right thereby sealing the axial bore 232 and preventing the general venting of air from supply reservoir 49 through the exhaust port 239a. Simultaneously, valve seat 237 opens annular passageway 235a which establishes communication between chamber 233 and interior passageway 236 to allow internal passageway 231 to communicate with passageway 236, exhaust port 238, manifold line 239 and exhaust port 239a. Thus, the air pressure present in the hand brake system is exhausted through conduit 54 and the hand brake release valve to the atmosphere at 239a, thereby energizing the spring motors present in each of the hydraulic to pneumatic converters. As each of the spring motors is energized, it displaces the hydraulic piston 166, and thereby actuates hydraulic motors 162 and 163 to effect a brake application on the vehicle.

It should be pointed out that this entire system is completely independent of the fluid or dynamic braking systems, and may be actuated at any time. It may be actuated as a parking brake when the vehicle is standing still, or be actuated as a "last ditch" emergency system when the car is in motion. The "last ditch" braking may be accomplished by manually venting hand brake control line 54 with the manual three-way valve 55a (of FIG. 1). This valve simultaneously closes communication between the supply reservoir and the hand brake control line 54, while venting hand brake control line 54 to the atmosphere. Provisions for manual release of the parking brakes in the event that air pressure is unavailable are also included. Referring to FIG. 4, this is accomplished by turning bolt 241 with a standard wrench. As bolt 241 is rotated, insert 240 is carried along the length of bolt 241 allowing displacement of push rod 173 to the right, while piston 165 remains in its extreme left hand position. The bolt 241 is advanced out until spring 176 retracts piston 166 enough to ease the hydraulic pressure imposed on brake motors 162 and 163.

While I have thus described the preferred embodiments of the present invention, other variations will be suggested to those skilled in the art. It must be therefore understood that the foregoing description is meant to be illustrative only and not limitive of the present invention; and all such variations and modifications as are in accord with the principles described herein, are meant to fall within the scope of the appended claims.

Having thus described my invention, I claim:
1. A brake system for light rail vehicles comprising
    a. a dynamic brake for said vehicle, said brake including means for generating variable electric current upon application of the dynamic brake, said means including an impedance to receive at least a portion of the variable current generated by said dynamic brake,
    b. fluid operated friction brakes for said vehicle, said brakes including means responsive to variations in fluid pressure for actuating said friction brakes,
    c. electrical control means for energizing said dynamic brake and said fluid operated friction brakes to effect braking of the vehicle,
    d. fluid pressure control means for providing variations in the fluid pressures applied to said friction brake means, said control means including
        1. blending means for adjusting the fluid pressure applied to said friction brakes, said blending means including an electropneumatic transducer which responds to variations in both the electrical current received by said impedance and an electrical current produced by said electric control means, to vary the fluid pressure supplied to said friction brakes,
        2. variable load valve means for controlling the fluid pressure supplied to said blending means, said means including an air spring and proportional valve, said valve being responsive to pressure variations in said air spring to vary the fluid pressures supplied to said blending means, and
    e. a skid controller including detector means for detecting skid condition and a release valve actuated by said controller for venting the fluid pressure supplied to said friction brakes, when said detector means detects a skid condition.

2. A brake system for a light weight rail vehicle as claimed in claim 1 wherein said means responsive to variations in fluid pressure include
    a. first and second pressure responsive fluid motors, said first fluid motor being responsive to positive fluid pressure variations from said blending means to actuate said friction brakes,
    b. spring motor means restrained by said second fluid motor, said spring motor being released by means restrained by said second fluid motor, the fluid pressure acting on said second fluid motor, thereby to actuate said friction brakes.

3. A brake system for light rail vehicles as claimed in claim 2 which further comprises a hydraulic motor means between said first fluid motor and said friction brake to provide hydraulic brake pressure to said friction brake to effect actuation thereof.

4. A brake system for light rail vehicles as claimed in claim 3 which further comprises hydraulic slack adjusting means mounted between said hydraulic motor means and said friction brake.

5. A brake system for light rail vehicles as claimed in claim 4 wherein said slack adjusting means comprises a pair of expansible chamber hydraulic devices having first and second working spaces normally isolated from each other by movable reaction elements, said means including a transfer valve means responsive to the movement of said reaction elements to permit flow from said first working space to said second working space when the volume of said second working space is at its minimum.

6. A brake system for light rail vehicles as claimed in claim 2 which further comprises hand brake control means, said means including a vent valve for reducing the pressure acting on said second fluid motor to affect actuation of said spring motor means.

7. A brake system for light rail vehicles as claimed in claim 2 wherein said blending means further comprises a. first and second torque motors, said first torque motor responding to electrical variations in the current received by said impedance, said second torque motor responding to said electrical current produced by said electric control means,
    b. proportioning valve means connected between said variable load valve means and said fluid operated friction brakes, said means effective to vary the fluid pressure supplied to said friction brakes, said proportioning valve responding to variations in a pilot fluid pressure,
    c. transducer means responsive to the sum of the combined outputs of said first and second torque motors to vary the pilot pressure for said proportioning valve.

8. A brake system for light rail vehicles as claimed in claim 7 wherein said proportioning valve further comprises a self-lapping supply and exhaust valve.

9. A brake system for light rail vehicles as claimed in claim 7 wherein said means responsive to said variations and fluid pressure include
    a. first and second pressure responsive fluid motors, ssid first fluid motor responsive to positive fluid pressure variations from said blending means to actuate said friction brakes, b. spring motor means restrained by said second fluid motor, said spring motor being released by reductions in the fluid pressure acting on second said fluid motor, thereby to actuate said friction brakes.

10. A brake system for light rail vehicles comprising a. a dynamic brake for said vehicle, said brake including means for generating variable electric current current upon application of said dynamic brake, said means including an impedance to receive at least one portion of the variable current generated by said means,
b. fluid operated friction brakes for said vehicle, said brakes including first and second pressure responsive fluid motors, said first fluid motor being responsive to positive fluid pressure variations to actuate said friction brakes, said brakes also including spring motor means restrained by said second fluid motor, said spring motor being released by reductions in the fluid pressure acting on said second fluid motor, thereby to actuate said friction brakes,
c. electrical control means for energizing the dynamic brake and a fluid pressure control means for said friction brakes, to effect the friction braking of the vehicle,
d. fluid pressure control means for providing variations in the fluid pressure applied to said friction brakes, said control means including
  1. blending means for adjusting the fluid pressure applied to said friction brakes, said blending means including a proportioning valve responsive to a pressure transducer, said transducer responding to an electric current produced by said electrical control means and the fluid pressure supplied to said friction brakes to control said proportioning valve,
  2. variable load means for controlling the fluid pressure supplied to said blending means, said means including an air spring and a variable control valve responsive to pressure in said air spring to vary the fluid pressure supplied to said blending means,
e. hand brake control means, said means including a vent valve for reducing the pressure acting on the second fluid motor of said fluid brakes to affect actuation of said spring motor means.

11. A brake system for light rail vehicles as claimed in claim 10 which further comprises a hydraulic fluid motor means mounted between said first fluid motor and said friction brake to provide hydraulic brake pressure to said friction brake to affect actuation thereof.

12. A brake system for light rail vehicles as claimed in claim 11 which further comprises hydraulic slack adjusting means mounted between said hydraulic fluid motor means and said friction brake.

13. A brake system for light rail vehicles as claimed in claim 10 wherein said blending means further comprises
  a. first and second torque motors, said first torque motor being responsive to electrical current received by said impedance, said second torque motor being responsive to said electrical current produced by said electrical control means.
  b. said proportioning valve means connected between said variable load means and said fluid operated friction brakes, said valve means being effective to vary the fluid pressure supplied to said brake means in response to pilot pressure produced by a transducer,
  c. transducer means responsive to the output of said torque motors and the pressure supplied to said friction brakes to vary the pilot pressure supplied to said proportioning valve.

14. A brake system for light rail vehicles as claimed in claim 13 wherein said proportioning valve comprises a self-lapping supply and exhaust valve.

15. A brake system for light rail vehicles as claimed in claim 2, wherein said electropneumatic transducer is further responsive to the fluid pressure supplied to said friction brake.

16. A brake system for light rail vehicles as claimed in claim 10, wherein said pressure transducer is further responsive to the variable current received by said impedance.

* * * * *

UNITED STATES PATENT AND TRADEMARK OFFICE
CERTIFICATE OF CORRECTION

PATENT NO. : 3,845,991
DATED : November 5, 1974
INVENTOR(S) : Thomas Engle

It is certified that error appears in the above-identified patent and that said Letters Patent are hereby corrected as shown below:

In column 24, lines 12-13 delete "means restrained by said second fluid motor" and insert -- reductions in --.

Signed and Sealed this fourth Day of November 1975

[SEAL]

Attest:

RUTH C. MASON
Attesting Officer

C. MARSHALL DANN
Commissioner of Patents and Trademarks